(12) United States Patent
Yoshida (10) Patent No.: US 8,333,425 B2
(45) Date of Patent: Dec. 18, 2012

(54) VEHICLE FRONT STRUCTURE

(75) Inventor: Koji Yoshida, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/131,981

(22) PCT Filed: Dec. 25, 2009

(86) PCT No.: PCT/JP2009/071618
§ 371 (c)(1),
(2), (4) Date: May 31, 2011

(87) PCT Pub. No.: WO2011/077554
PCT Pub. Date: Jun. 30, 2011

(65) Prior Publication Data
US 2012/0056447 A1 Mar. 8, 2012

(51) Int. Cl.
*B60J 7/00* (2006.01)
(52) U.S. Cl. .................................. 296/187.09
(58) Field of Classification Search ............ 296/187.09, 296/203.02; 180/274; 280/784
See application file for complete search history.

(56) References Cited

U.S. PATENT DOCUMENTS

| | | | |
|---|---|---|---|
| 5,605,353 A | 2/1997 | Moss et al. | |
| 5,884,963 A | 3/1999 | Esposito et al. | |
| 6,808,229 B2 * | 10/2004 | Yamaguchi | 296/204 |
| 7,900,964 B2 * | 3/2011 | Chretien et al. | 280/784 |
| 8,118,349 B2 * | 2/2012 | Kihara et al. | 296/187.09 |

FOREIGN PATENT DOCUMENTS

| | | |
|---|---|---|
| JP | A-11-208228 | 8/1999 |
| JP | A-2002-53076 | 2/2002 |
| JP | A-2004-130827 | 4/2004 |
| JP | A-2004-237969 | 8/2004 |
| JP | A-2005-81954 | 3/2005 |
| JP | A-2007-216901 | 8/2007 |
| JP | A-2009-51440 | 3/2009 |
| JP | A-2009-154617 | 7/2009 |

* cited by examiner

*Primary Examiner* — Joseph Pape
(74) *Attorney, Agent, or Firm* — Oliff & Berridge, PLC (57) ABSTRACT

A vehicle front structure related to the invention includes a front side member having a kick section extending obliquely downward toward the rear, a member front half section, and a member rear half section. A sub-frame juxtaposed below the front side member abuts on the member rear half section. A rear end portion of the sub-frame is formed with a first inclination portion which extends obliquely downward toward the rear and abuts on the front side member. The front side member 1 is formed with a second inclination portion which abuts on the first inclination portion. The first inclination portion is held so as to be movable relative to the second inclination portion.

6 Claims, 7 Drawing Sheets

VEHICLE FRONT STRUCTURE

TECHNICAL FIELD

The present invention relates to a vehicle front structure in which a sub-frame is arranged below a front side member.

BACKGROUND ART

Conventionally, there is Japanese Unexamined Patent Application Publication No. 2004-237969 as a technique of such a field. In a vehicle front structure described in this publication, a sub-frame is arranged under a front side member. A front end of the sub-frame is coupled to the front side member via a first cross member, and a rear end of the sub-frame is coupled to a front end of a member rear half section of the front side member via a bolt. A bolt is fixed to the member rear half section, and a rear end of the sub-frame is formed with a long hole through which a bolt passes. Also, two upper and lower plates are fixed to the sub-frame so as to sandwich the long hole therebetween, and a part of the long hole is closed by each plate. When a vehicle including such a vehicle front structure is involved in a head-on collision, the load input to the vehicle can be distributed to the front side member and the sub-frame, and the input load to the front side member can be controlled.

CITATION LIST

Patent Literature

Patent Literature 1: Japanese Unexamined Patent Application Publication No. 2004-237969
Patent Literature 2: Japanese Unexamined Patent Application Publication No. 2002-053076

SUMMARY OF INVENTION

Technical Problem

The plates fixed to the sub-frame are deformed by the bolt, thereby transmitting the input load of the sub-frame to the front side member. Accordingly, the load input to the sub-frame can be controlled, and efficient energy absorption in the sub-frame can be achieved. However, further improvement in the energy absorption performance is desired.

The object of the invention is to provide a vehicle front structure adapted to further improve the energy absorption efficiency of the load input to a sub-frame.

Solution to Problem

A vehicle front structure of the invention includes a front side member having a kick section extending obliquely downward toward the rear, a member front half section located closer to the front of a vehicle than the kick section, and a member rear half section located closer to the rear of the vehicle than the kick section; and a sub-frame juxtaposed below the member front half section and abutting on the member rear half section or the kick section. Here, a rear end portion of the sub-frame is formed with a first inclination portion which extends obliquely downward toward the rear and abuts on the front side member, the front side member is formed with a second inclination portion which abuts on the first inclination portion, and the first inclination portion is held so as to be movable relative to the second inclination portion.

In this vehicle front structure, at the time of head-on collision, the first inclination portion formed at the rear end portion of the sub-frame moves while sliding along the second inclination portion formed at the front side member. At this time, since the first inclination portion continues abutting on the second inclination portion, the input load of the sub-frame can be continuously transmitted to the front side member. As a result, the input load of the sub-frame can be efficiently transmitted to the front side member. Moreover, even if a bending moment that deforms the kick section is generated due to the input load of the front side member, a bending moment which cancels all or part of such a bending moment can be generated by the input load of the sub-frame. Accordingly, bending of the kick section can be suppressed. In such a vehicle front structure, the deformation stroke of the front side member is easily secured, the canceling force of the bending moment in the kick section can be generated, and energy absorption efficiency can be improved.

Preferably, the first inclination portion and/or the second inclination portion is formed with a long hole which extends in the direction of inclination, a shank of a bolt is inserted into the long hole, and the first inclination portion and the second inclination portion are brought into pressure contact with each other by the cooperation between the bolt and a nut.

When such a configuration is adopted, at the time of collision, maintenance of the state of continuous abutting of the first inclination surface on the second inclination surface can be realized by a simple configuration, and reliability is also achieved.

Preferably, the second inclination portion is formed at a projection part which projects downward at a front end portion of the member rear half section.

Through such a configuration, the overall length of the member rear half section can be effectively utilized at the time of energy absorption of the load input to the sub-frame.

Preferably, the projection part is formed at the member rear half section integrally or by welding.

By adopting welding, the projection part can be manufactured as a separate part, and a design change becomes easy.

Preferably, the sub-frame has a first member and a second member, the first member is located in front of the second member, and a rear end portion of the first member is formed with a third inclination portion which extends obliquely downward toward the rear and abuts on a front end portion of the second member, the front end portion of the second member is formed with a fourth inclination portion which abuts on the third inclination portion, and the third inclination portion is held so as to be movable relative to the fourth inclination portion.

When such a configuration is adopted, the energy absorption efficiency of the load input to the sub-frame can be controlled even in the middle of the sub-frame. Thus, the scope of application to a vehicle can be expanded.

Preferably, the first member has a lower rigidity than the second member.

In such a configuration, at the time of collision, the second member deforms after deformation of the first member. Thus, deformation of the second member can be suppressed, and the configuration is suitable for a case where the deformation volume of the second member is desirably made small.

A vehicle front structure related to the invention includes a joining surface between a kick section of a front side member and a sub-frame. The joining surface is formed by an inclined surface which is movable in arbitrary directions due to load.

Advantageous Effects of Invention

According to the invention, the energy absorption efficiency of the load input to the sub-frame can be further improved.

REFERENCE SIGNS LIST

1: FRONT SIDE MEMBER
2: SUB-FRAME
10: MEMBER FRONT HALF SECTION
11: KICK SECTION
12: MEMBER REAR HALF SECTION
13: FIRST MEMBER
14: SECOND MEMBER
20, 40: PROJECTION PART
23a: SECOND INCLINATION PORTION
23b: LONG HOLE
26: BOLT
26a: SHANK OF BOLT
27: NUT PORTION
30a: FIRST INCLINATION PORTION
31a: THIRD INCLINATION PORTION
34a: FOURTH INCLINATION PORTION

DESCRIPTION OF EMBODIMENTS

Preferred embodiments of a vehicle front structure related to the invention will be described below in detail, referring to the drawings.

Figure 1:
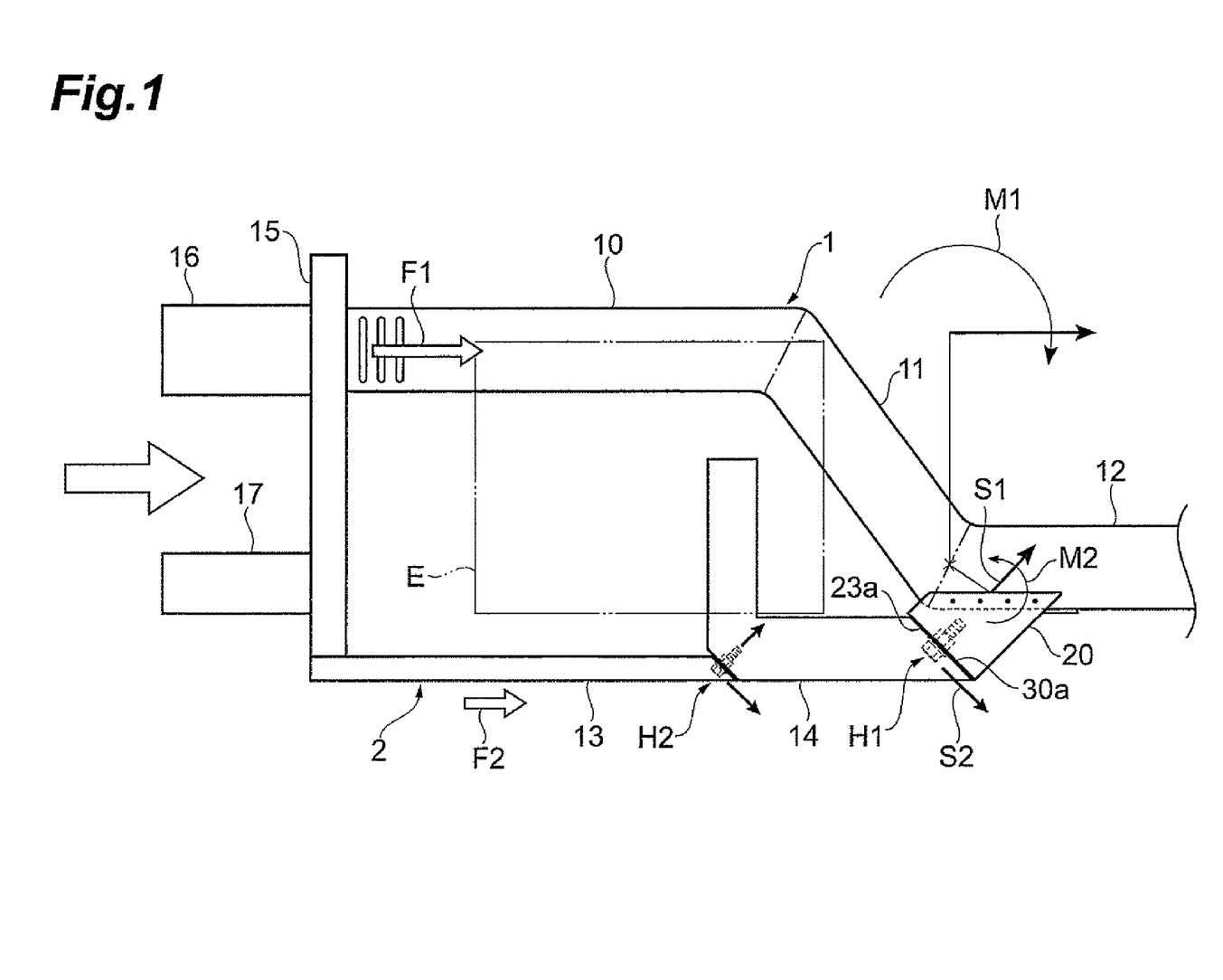
FIG. 1 is a side view showing one embodiment of a vehicle front structure related to the invention.

As shown in FIG. 1, in the vehicle front structure with enhanced collision safety, a sub-frame 2 is juxtaposed below a front side member 1. Each of right and left front side members 1 which extend in a vehicle front-and-rear direction is provided with a kick section 11 which extends obliquely downward toward the rear in the middle. A member front half section 10 which extends substantially in a horizontal direction within an engine room is provided in front of the kick section 11. A member rear half section 12 which extends horizontally rearward along the undersurface of a passenger compartment floor is provided behind the kick section 11. Also, the right and left front side members 1 are coupled together by cross members.

The sub-frame 2 has a sub-member (first member) 13 which extends substantially in the horizontal direction within the engine room, and a suspension member (second member) 14 which supports an engine E, a suspension, or the like. A radiator core support 15 is coupled to front ends of the front side member 1 and the sub-frame 2, and crash boxes 16 and 17 are fixed to the radiator core support 15. Also, a reinforcement of a bumper is fixed to front ends of the crash boxes 16 and 17.

Figure 2:
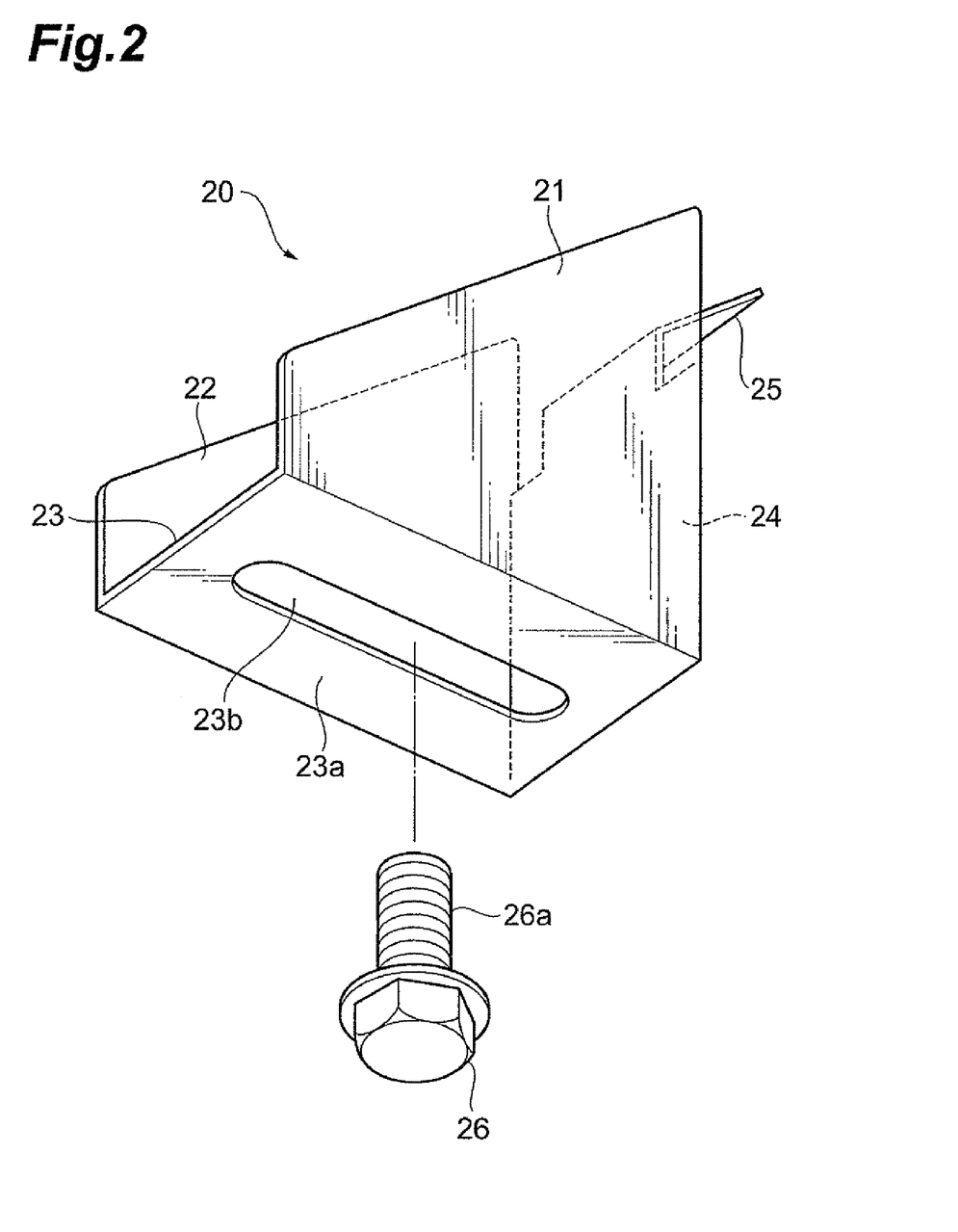
FIG. 2 is a perspective view showing a projection part and a bolt.

A front end portion of the member rear half section 12 is provided with a projection part 20 which projects downward. In a rear-side coupling portion H1, a rear end of the sub-frame 2 is coupled to the projection part 20. As shown in FIG. 2, the projection part 20 is fixed to the front end portion of the member rear half section 12 by welding, and is formed in a hollow shape, thereby allowing reduction in weight. By fixing the projection part 20 to the front end portion of the member rear half section 12, the overall length of the member rear half section 12 can be effectively utilized at the time of energy absorption of the load input to the sub-frame 2.

Figure 3:
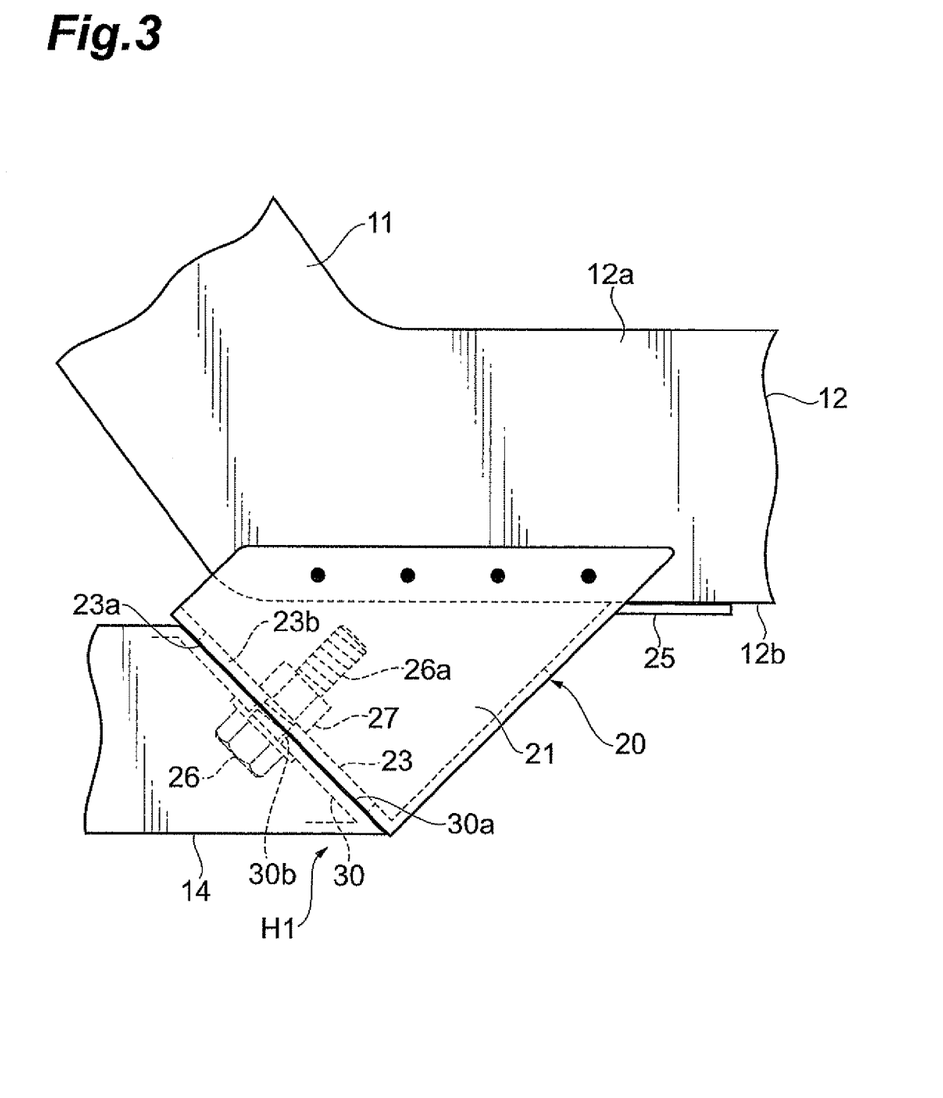
FIG. 3 is a side view showing a rear-side coupling portion.

As shown in FIGS. 2 and 3, the projection part 20 is fixed to a lateral face 12a of the member rear half section 12, and has lateral plates 21 and 22 which are parallel to each other, a front plate 23 which couples together the lateral plates 21 and 22 and is provided with a guide surface (second inclination portion) 23a, a back plate 24 which is fixed to a rear end of the front plate 23 and rear ends of the lateral plates 21 and 22, and a tongue piece 25 which protrudes rearward from an upper end of the back plate 24. Free ends of the lateral plates 21 and 22 are fixed to the lateral face 12a of the member rear half section 12 by spot welding, and the tongue piece 25 is fixed to an undersurface 12b of the member rear half section 12 by spot welding. By adoption of the tongue piece 25, the stability of the projection part 20 is enhanced, and the input load F2 is easily transmitted to the member rear half section 12. Since the projection part 20 is manufactured as a separate part, a design change is easy.

The guide surface 23a of the front plate 23 extends obliquely downward toward the rear, and the front plate 23 is formed with a long hole 23b which extends in the direction of inclination. A shank 26a of a bolt 26 is inserted into the long hole 23b.

A rear end portion of the suspension member 14 is provided with a rear end plate 30, and the rear end plate 30 is formed with an abutting surface (first inclination portion) 30a which extends obliquely downward toward the rear. The rear end plate 30 is formed with a circular hole 30b through which the shank 26a of the bolt 26 passes. The shank 26a of the bolt 26 is inserted into the circular hole 30b and the long hole 23b, and a nut 27 is threaded into the shank 26a. Thereby, the abutting surface 30a of the rear end plate 30 and the guide surface 23a of the front plate 23 of the projection part 20 are brought into pressure contact with each other by a predetermined fastening force. In addition, this fastening force is such that the abutting surface 30a slides along the guide surface 23a when a predetermined load is input to the suspension member 14.

The strength of the shank 26a in relation to whether or not the shank 26a of the bolt 26 arrives at the edge of the long hole 23b and whether or not the shank 26a is fractured is set on the basis of the load S2.

Figure 4:
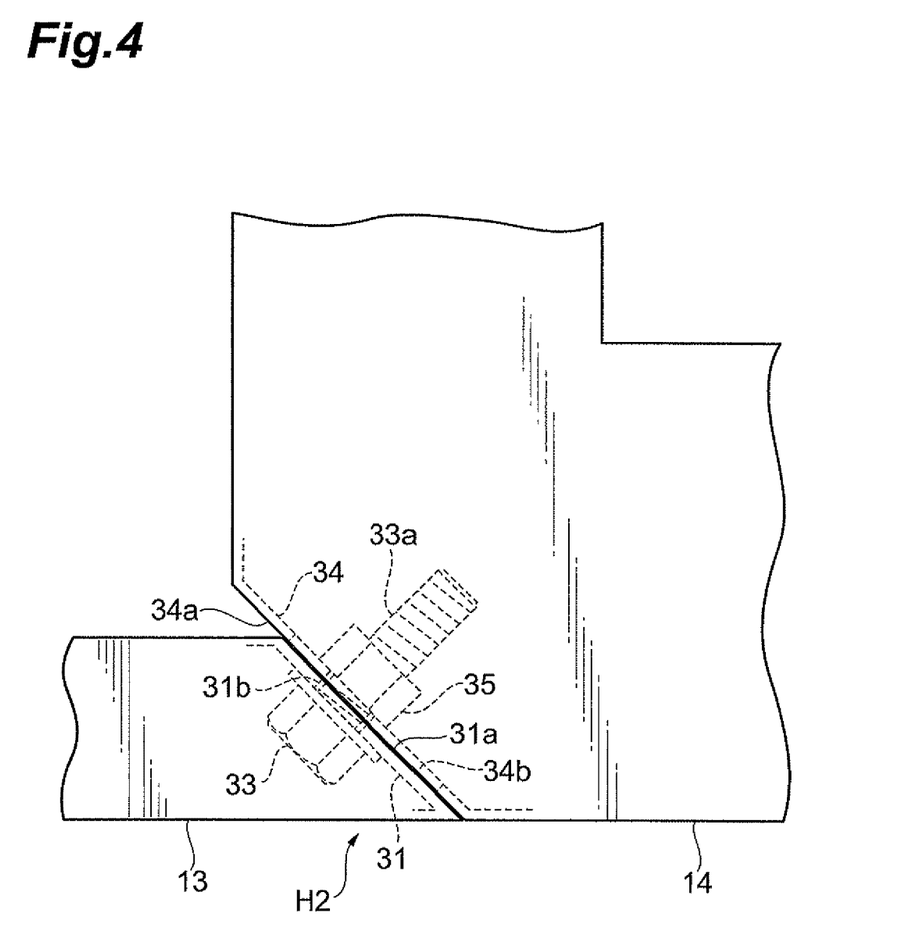
FIG. 4 is a side view showing a front-side coupling portion.

As shown in FIGS. 1 and 4, in a front-side coupling portion H2, a rear end portion of the hollow rod-shaped sub-member 13 is provided with a rear end plate 31, and the rear end plate 31 is provided with an abutting surface (third inclination portion) 31a which extends obliquely downward toward the rear. The rear end plate 31 is formed with a circular hole 31b through which a shank 33a of a bolt 33 passes.

A front end portion of the suspension member 14 is formed with a front end plate 34, and the front end plate 34 is formed with a guide surface (fourth inclination portion) 34a which extends obliquely downward toward the rear. The front end plate 34 is formed with a long hole 34b which extends in the direction of inclination and through which the shank 33a of the bolt 33 passes. In addition, the guide surface 34a located on the front side of the suspension member 14 and the abutting surface 30a located on the rear side are set to have the same angle of inclination. The guide surface 34a and the abutting surface 30a may be set to have different angles of inclination.

The shank 33a of the bolt 33 is inserted into the circular hole 31b and the long hole 34b, and a nut 35 is threaded into the shank 33a. Thereby, the abutting surface 31a of the rear end plate 31 and the guide surface 34a of the front end plate 34 of the suspension member 14 are brought into pressure contact with each other by a predetermined fastening force.

Figure 5:
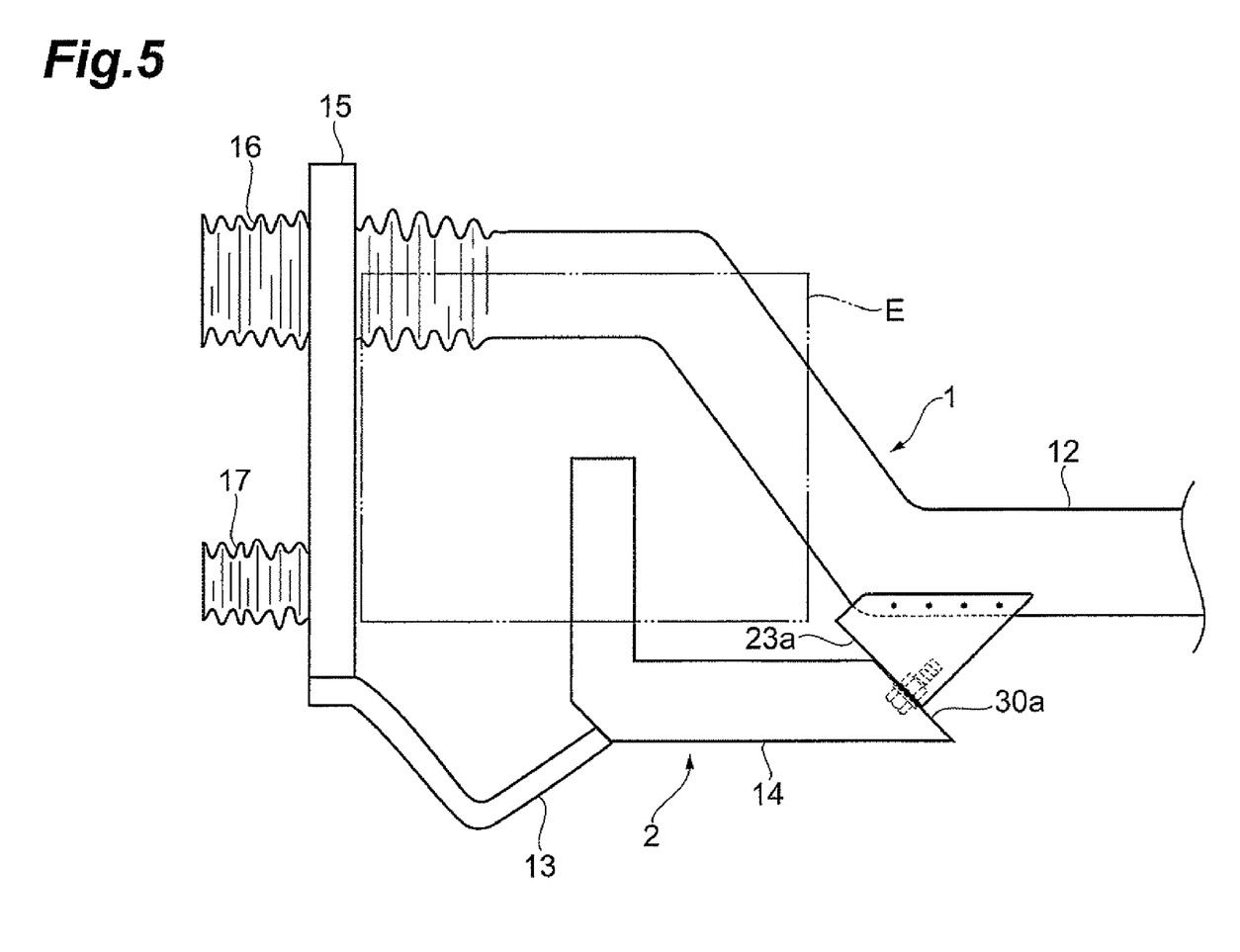
FIG. 5 is a side view showing the state of the vehicle front structure after collision.

As shown in FIG. 5, at the time of head-on collision, the abutting surface (first inclination portion) 30a formed at the rear end portion of the sub-frame 2 moves while sliding along the guide surface (second inclination portion) 23a formed at the front side member 1. At this time, since the abutting surface 30a continues abutting on the guide surface 23a, the input load of the sub-frame 2 can be continuously transmitted to the member rear half section 12 of the front side member 1. As a result, the input load of the sub-frame 2 can be efficiently transmitted to the front side member 1.

At this time, since the sub-member 13 has rigidity lower than the suspension member 14, the sub-member 13 can be easily deformed ahead of the suspension member 14. Since such a configuration can suppress deformation of the sub-member 13 at the time of collision, the configuration is suitable for a case where the deformation volume of the sub-member 13 is desirably made small.

As shown in FIG. 1, even if a bending moment M1 that deforms the kick section 11 due to the input load F1 of the front side member 1 is generated, the input load F2 of the sub-frame 2 is distributed to loads S1 and S2 on the guide surface 23a. Thus, a bending moment M2 which cancels the bending moment M1 can be generated due to the distributed load S1. Accordingly, bending of the kick section 11 can be suppressed by the bending moment M2.

As mentioned above, in the vehicle front structure, the deformation stroke of the front side member 1 is easily secured, the canceling force of the bending moment M1 in the kick section 11 can be generated, and energy absorption efficiency can be improved.

Additionally, the shank 26a of the bolt 26 is inserted into the long hole 23b, and the abutting surface (first inclination portion) 30a is brought into pressure contact with the guide surface (second inclination portion) 23a by the cooperation between the bolt 26 and the nut 27. Therefore, at the time of collision, maintenance of the state of continuous abutting of the abutting surface 30a on the guide surface 23a can be realized by a simple configuration, and reliability is also achieved.

Since the front-side coupling portion 112 includes the same configuration as the rear-side coupling portion H1, the energy absorption efficiency of the load input to the sub-frame 2 can be controlled even in the middle of the sub-frame 2. Thus, adoption of the front-side coupling portion H2 can expand the scope of application to a vehicle.

Figure 7:
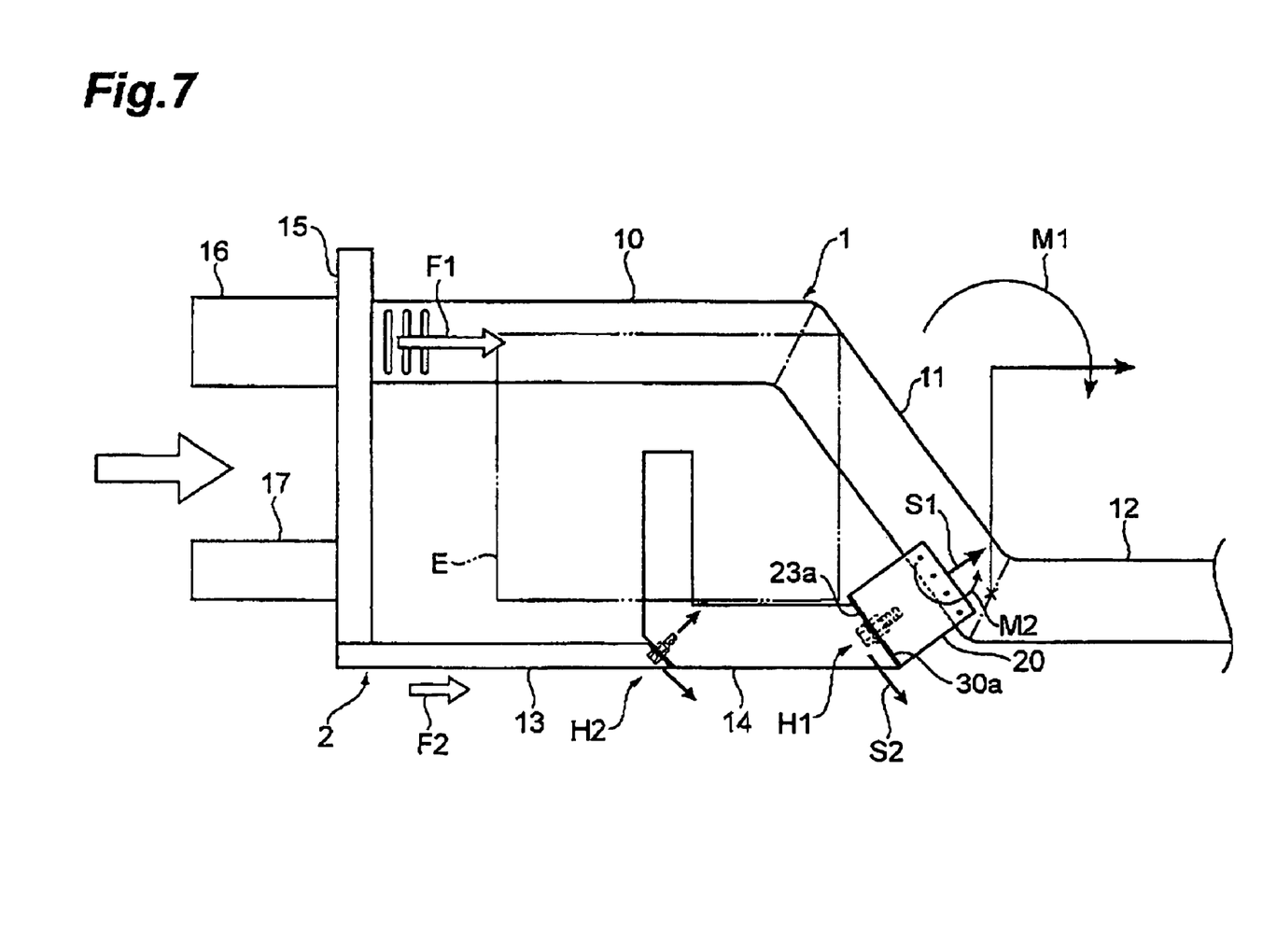
FIG. 7 is a side view showing one embodiment of a vehicle front structure related to the invention.

As shown in FIG. 7, in the vehicle front structure related to the invention, the projection part 20 may be welded to the kick section 11 such that the input load of the sub-frame 2 is transmitted to the kick section 11.

The circular hole 30b and the circular hole 31b may be long holes. In this case, the long hole 23b and the long hole 34b may be either a circular hole or a long hole.

As the amount of sliding of the sub-frame 2 along the guide surface 23a is made larger, the limit of movement of the suspension member 14 which supports the engine E, the suspension, or the like can be set to be long at the time of collision.

Figure 6:
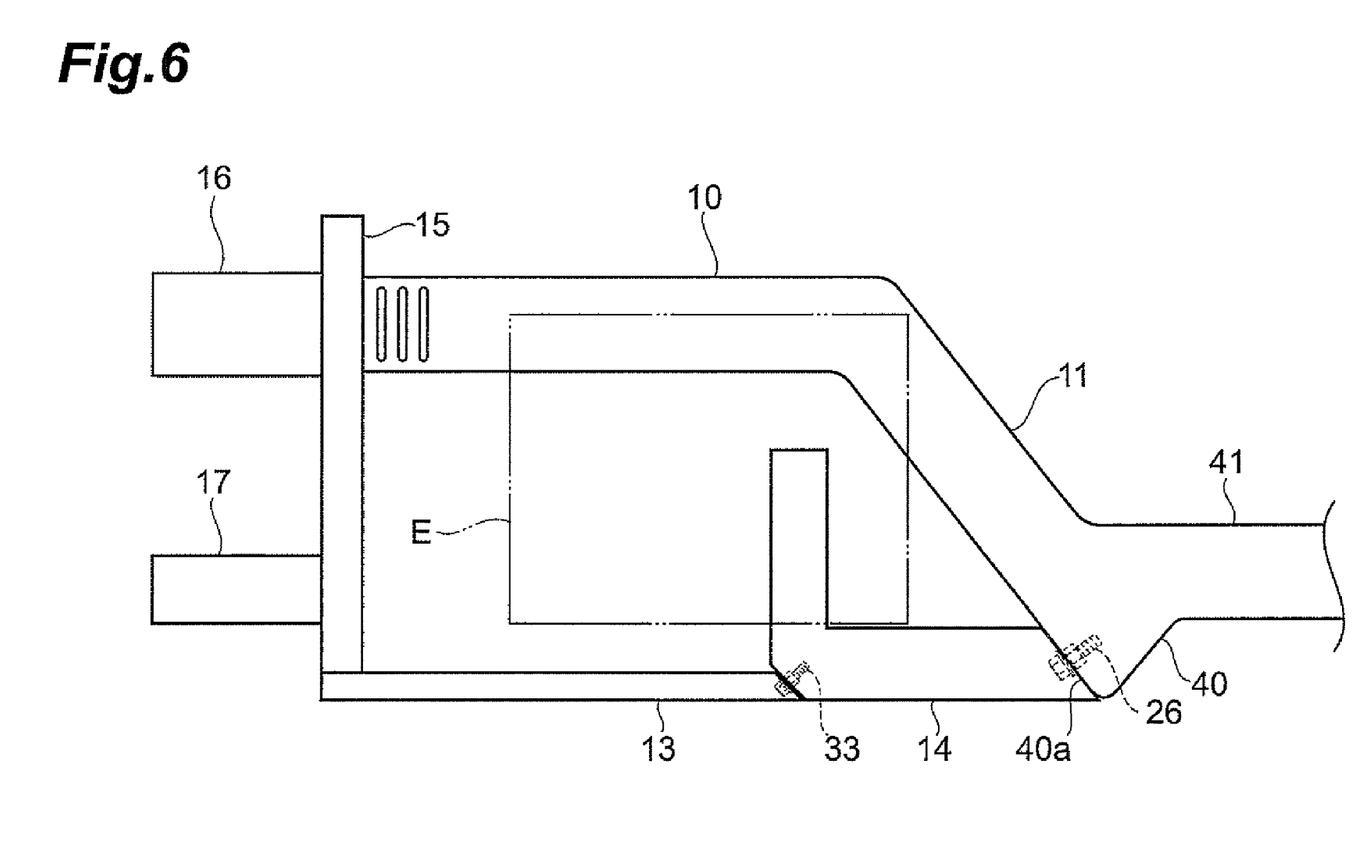
FIG. 6 is a side view showing another embodiment of the vehicle front structure related to the invention.

As shown in FIG. 6, in the vehicle front structure related to another embodiment, a projection part 40 having an inclined guide surface 40a is formed integrally with a front section of a member rear half section 41. The other configurations are the same as those of the vehicle front structure shown in FIG. 1.

INDUSTRIAL APPLICABILITY

According to the invention, the energy absorption efficiency of the load input to the sub-frame can be further improved.

The invention claimed is:

1. A vehicle front structure comprising:
 a front side member having a kick section extending obliquely downward toward the rear, a member front half section located closer to the front of a vehicle than the kick section, and a member rear half section located closer to the rear of the vehicle than the kick section; and
 a sub-frame juxtaposed below the member front half section and abutting on the member rear half section or the kick section,
 wherein a rear end portion of the sub-frame is formed with a first inclination portion which extends obliquely downward toward the rear and abuts on the front side member, the front side member is formed with a second inclination portion which abuts on the first inclination portion, and the first inclination portion is held so as to be movable relative to the second inclination portion,
 wherein the sub-frame has a first member and a second member, and the first member is located in front of the second member, and
 wherein a rear end portion of the first member is formed with a third inclination portion which extends obliquely downward toward the rear and abuts on a front end portion of the second member, the front end portion of the second member is formed with a fourth inclination portion which abuts on the third inclination portion, and the third inclination portion is held so as to be movable relative to the fourth inclination portion.

2. The vehicle front structure according to claim 1, wherein one or both of the first inclination portion and the second inclination portion are formed with a long hole which extends in the direction of inclination, a shank of a bolt is inserted into the long hole and the first inclination portion and the second inclination portion are brought into pressure contact with each other by the cooperation between the bolt and a nut.

3. The vehicle front structure according to claim 1, wherein the second inclination portion is formed at a projection part which projects downward at a front end portion of the member rear half section.

4. The vehicle front structure according to claim 3, wherein the projection part is formed at the member rear half section integrally or by welding.

5. The vehicle front structure according to claim 1, wherein the first member has a lower rigidity than the second member.

6. The vehicle front structure according to claim 1, wherein the second inclination portion is formed at a projection part which projects from the kick section.

* * * * *